(12) United States Patent
Vilain

(10) Patent No.: US 6,227,073 B1
(45) Date of Patent: May 8, 2001

(54) MODULAR DRIVE SYSTEM

(75) Inventor: Thomas Vilain, Velen (DE)

(73) Assignee: Mannesmann AG, Düsseldorf (DE)

( * ) Notice: Subject to any disclaimer, the term of this patent is extended or adjusted under 35 U.S.C. 154(b) by 0 days.

(21) Appl. No.: 09/293,715

(22) Filed: Apr. 16, 1999

(30) Foreign Application Priority Data

Apr. 17, 1998 (DE) .............................................. 198 17 937
May 26, 1998 (DE) .............................................. 198 24 670

(51) Int. Cl.[7] .............................. F16H 57/02; F16H 1/02; F16B 13/00
(52) U.S. Cl. ...................... 74/606 R; 74/413; 74/421 A; 403/14
(58) Field of Search .................................. 74/413, 421 A, 74/606 R; 403/13, 14; 29/464

(56) References Cited

U.S. PATENT DOCUMENTS

| 2,540,973 | * | 2/1951 | Wallace ................................. 74/413 |
| 3,246,538 | * | 4/1966 | Easton ................................ 74/606 R |
| 4,951,527 | * | 8/1990 | Klazura .............................. 74/606 R |
| 5,404,772 | * | 4/1995 | Jester ................................. 74/606 R |
| 5,570,605 | * | 11/1996 | Kitagawara et al. .............. 74/606 R |

FOREIGN PATENT DOCUMENTS

OS 20 19 434 * 11/1971 (DE) .
24 03 504 U * 7/1975 (DE) .
1-210232 * 8/1999 (JP) .

OTHER PUBLICATIONS

German publication VDI–Z, vol. 114 (1972), No. 2, pp. 122–129, entitled: "State and Tendencies in Development Relating to the Construction and Application of Geared Motors".*

* cited by examiner

Primary Examiner—Thomas R. Hannon
Assistant Examiner—William C Joyce
(74) Attorney, Agent, or Firm—Henry M. Feiereisen

(57) ABSTRACT

A modular drive system, includes a plurality of assemblies connectable to one another in series, wherein immediately adjoining two assemblies form, in the flow direction of power, a leading assembly having a case and a rotatably supported driving shaft set within the case, and a trailing assembly having a case and a driven shaft in operative communication with the driving shaft. In order to allow a screwed connection between the successive assemblies while still maintaining a precise spacing between the shafts of meshing gears, the cases of the successive assemblies are aligned by a centering pin which is received in form-fitting engagement in a single centering opening formed by complementary aligned bores provided in confronting walls of the cases, with the centering opening extending parallel to the driving shaft of the leading assembly and the driven shaft of the trailing assembly and defining a longitudinal axis which lies in a common plane with the driving shaft of the leading assembly and the driven shaft of the trailing assembly.

8 Claims, 3 Drawing Sheets

MODULAR DRIVE SYSTEM

CROSS-REFERENCES TO RELATED APPLICATIONS

This application claims the priority of German Patent Applications, Serial Nos. 198 17 937.5, filed Apr. 17, 1998 and 198 24 670.6, filed May 26, 1998, the subject matter of which is incorporated herein by reference.

BACKGROUND OF THE INVENTION

The present invention relates, in general, to a drive system, and more particularly to a modular drive system including a plurality of assemblies which can be mounted with their cases to one another in series and have at least one rotatably supported driveshaft.

It is generally known to provide in particular a two-step main transmission with subtransmissions in order to attain the desired power transmission path. The main transmission and the subtransmissions are oftentimes accommodated in separate cases. Before installation of both assemblies, the output shaft and the overhung mounted output pinion are disposed in a respective opening of the main transmission, and both cases are securely fixed to one another. Once installed, the output pinion is in mesh with the input gear wheel of the main transmission.

Conventional drive systems have the drawback that a precise distancing between the gear shafts is difficult to maintain, i.e. these systems require the provision of case fittings which are placed in concentric disposition to the shafts, or the provision of several centering pins. For example, German Pat. No. DE 24 035 04 A1 describes the securement of the cases by means of at least two centering pins.

SUMMARY OF THE INVENTION

It is thus an object of the present invention to provide an improved drive system, obviating the afore-stated drawbacks.

In particular, it is an object of the present invention to provide an improved drive system which is of modular configuration to allow easy joining of assemblies such that their cases can be connected to one another by screw fasteners while maintaining a precise spacing between the shafts for the meshing gear wheels.

These objects, and others which will become apparent hereinafter, are attained in accordance with the present invention by providing a modular drive system comprised of a plurality of assemblies connectable to one another in series, wherein immediately adjoining two assemblies forming, in the direction of flow of power, a leading assembly having a case and a rotatably supported driving shaft set within the case, and a trailing assembly having a case and an driven shaft in operative communication with the driving shaft, whereby the case of the leading assembly and the case of the trailing assembly are aligned with one another by a centering pin which is received in form-fitting engagement in a single centering opening formed by complementary aligned bores provided in confronting walls of the case of the leading assembly and the case of the trailing assembly, whereby the centering opening extends parallel to the driving shaft of the leading assembly and the driven shaft of the trailing assembly and defines a longitudinal axis which is oriented in a common plane with the driving shaft of the leading assembly and the driven shaft of the trailing assembly.

As a consequence of disposing the centering pin in a common plane with the driven shaft and the driving shaft, the shafts are spaced from one another at the exact, intended location when joining successive assemblies so that the gear wheels mounted on the shafts mesh with one another. Only a single, cost-efficient centering pin is required to realize the precise positioning of successive assemblies, while still permitting the cases of the assemblies to be securely fastened to one another by conventional fastening means, in particular screws.

The capability to combine assemblies can be further enhanced by allowing selective attachment of a subtransmission or a motor unit to each assembly, whereby the output pinions of the subtransmission and the motor unit are of same size and disposed at a same location in the trailing assembly when being installed.

BRIEF DESCRIPTION OF THE DRAWING

The above and other objects, features and advantages of the present invention will now be described in more detail with reference to the accompanying drawing, in which.

DETAILED DESCRIPTION OF PREFERRED EMBODIMENTS

Figure 1:
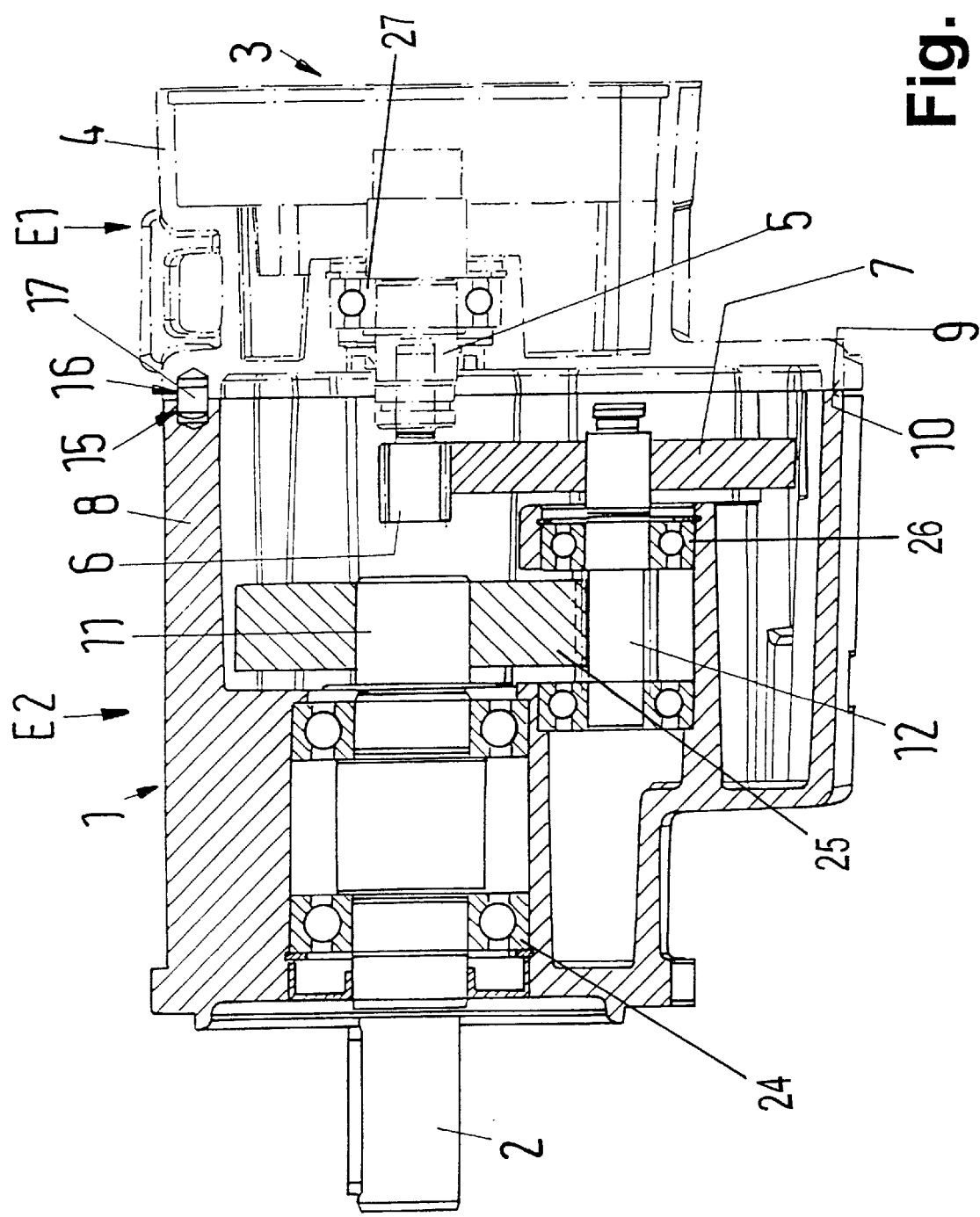
FIG. 1 is a partially sectional view of a drive system according to the present invention, comprised of a main transmission and a motor unit.

Throughout all the Figures, same or corresponding elements are generally indicated by same reference numerals.

Figure 2:
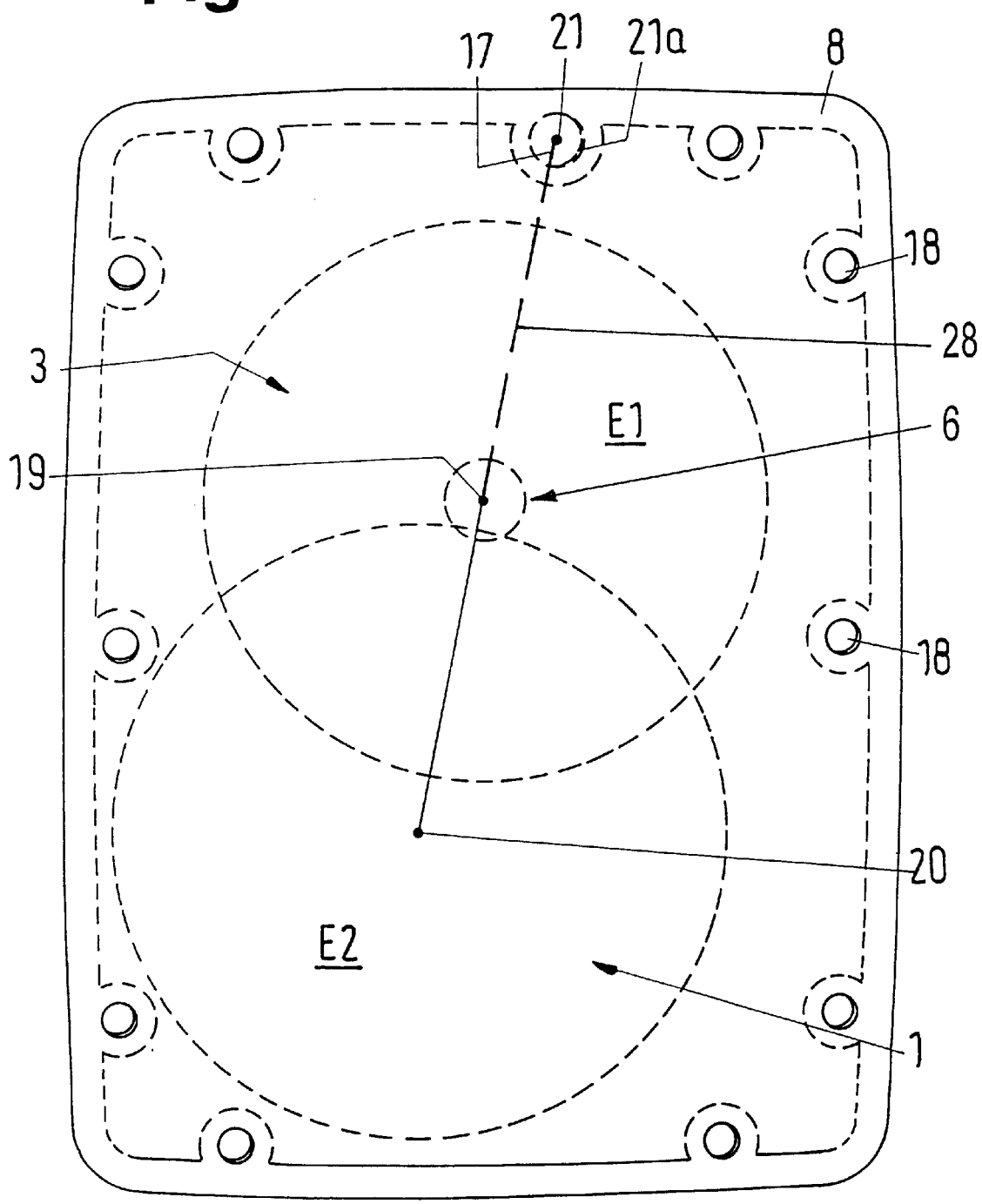
FIG. 2 is a schematic plan view of the drive system of FIG. 1, illustrating a positional relationship between driving shaft, driven shaft and a single centering pin; an FIG. 3 is a schematic plan view of a drive system according to the present invention, comprised of a main transmission, a motor unit and a subtransmission interposed between the main transmission and the motor unit.

Turning now to the drawing, and in particular to FIG. 1, there is shown a partially sectional view of a modular drive system according to the present invention including a main transmission 1 forming part of a first assembly E2 and a motor 3 forming part of a second assembly E1. The main transmission 1 has a case 8 which is made of cast metal. Set within the case 8 is an output shaft 2 which is rotatably supported by bearings 24 and projects out of the case 8, e.g. for transmitting a desired speed. The main transmission 1 includes a gear shaft 11 which is connected in line with the output shaft 2 and carries a gear wheel 25 for meshing with a driven gear shaft 12. The gear shaft 12 is supported within the case 8 by bearings 26 for rotation about a rotation axis 20 (FIG. 2). Mounted on the gear shaft 12 is an input gear wheel 7 which is in mesh with an output pinion 6 overhung mounted on an output shaft 5 of the motor 3. The motor 3 has a case 4 made of cast metal and is formed with a feedthrough opening for passage of the output shaft 5 into the case 8 of the main transmission 1. The output shaft 5 is supported in the case 4 by bearings 27 for rotation about a rotation axis 19. As shown in FIG. 1, the output shaft 5 is arranged in parallel relationship to the gear shafts 11, 12.

The case 4 of the motor unit 3 is detachably securable to the case 8 of the main transmission 1 at the side distal to the output shaft 2. Thus, the motor 3 and the main transmission 1 have confronting attachment surfaces 9, 10 which are securely fixed to one another at circumferential points of attachment 18 (FIG. 2) by means of a plurality of fasteners, e.g. screws.

In the area of the upper interface, the cojoined cases 8, 4 have aligned bores 15, 16 to form a single cylindrical centering opening 21a (FIG. 2) for receiving a complementary cylindrical centering pin 17 in a form-fitting manner. The centering pin 17 thus projects with one half into the bore 15 of the case 8 and with its other half into the bore 16 of the case 4, and is defined by a longitudinal axis which lies in a common plane with the output shaft 5 of the motor 3 and the gear shaft 12 of the main transmission 1.

Turning now to FIG. 2, there is shown a schematic plan view of the drive system in direction of the attachment surface 10 of the case 8 in order to show the positional relationship between the centering pin 17, placed in the centering opening 21a and defined by a center axis 21, and the rotation axes 19, 20 of the output shaft 5 and the gear shaft 12, respectively. As indicated in FIG. 2 by reference numeral 28, the center axis 21 lies on a common line with the rotation axis 19 of the output shaft 5 of the motor 3 and the rotation axis 20 of the gear shaft 12 of the main transmission 1.

Figure 3:
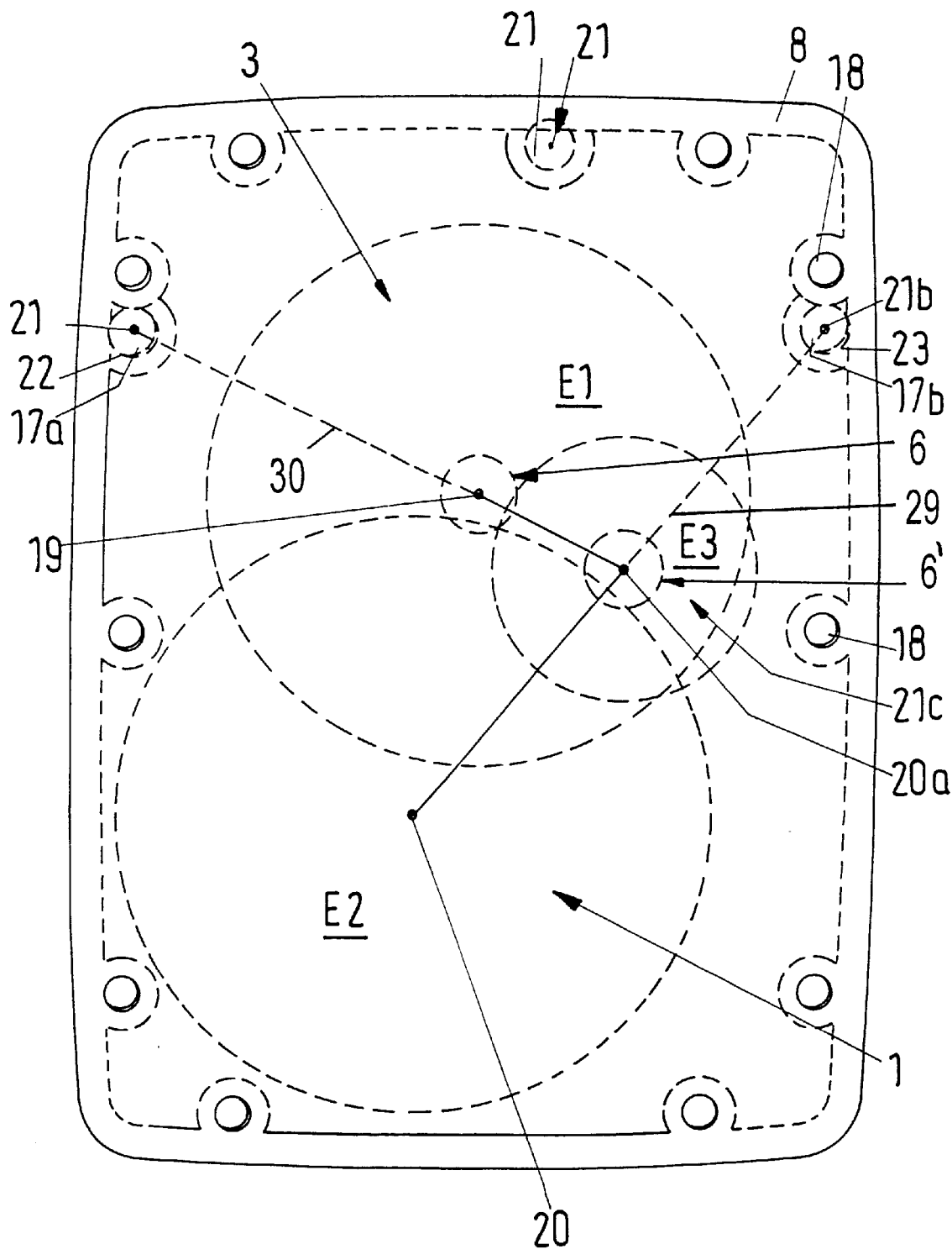

It will be appreciated that the modular drive system, as shown in FIGS. 1 and 2, is described only by way of an example to illustrate the principle of the present invention. As will be described in conjunction with FIG. 3, also by way of example, the drive system may have incorporated between the main transmission 1 and the motor 3 any suitable number of subtransmissions 21c which are represented in FIG. 3 by subtransmission E3. Each of the subtransmissions has also gear shafts 11, 12 in a same disposition as the main transmission 1. Regardless of the number of subtransmission 21c following in sequence the main transmission 1, the attachment of the motor 3 to the adjoining one of the subtransmissions 21c is such that the output shaft 5 of the motor 3 and the respective gear shafts 11, 12 of all interposed subtransmission 21c and of the main transmission 1 extend in parallel relationship. Each one of the assemblies E1 (motor 3), E2 (main transmission 1), E3 (subtransmission 21c) is accommodated in a separate case of cast metal, such as cases 4, 8, with abutting attachment surfaces 9, 10 of cojoined assemblies being securely fixed to one another.

Whether the motor 3 or a subtransmission 21c is selected for attachment depends on the application at hand, whereby the output pinion 6 of the motor 3 and the output pinion 6' of the subtransmission 21c are of a same size. When configuring the modular drive system according to the present invention with one or more subtransmissions 21c cojoined in series behind one another, the motor 3 is secured in each configuration to the first subtransmission 21c, as viewed in the flow direction of power, i.e. the subtransmission 21c furthest distant to the output shaft 2.

FIG. 3 shows an exemplified embodiment of a modular drive system according to the invention with main transmission 1, motor 3, and one subtransmission 21c which is interposed between the main transmission 1 and the motor 3, and includes a case (not shown) accommodating an output shaft supported for rotation about a rotation axis 20a. As shown in FIG. 3, the case 8 of the main transmission 1 has a second centering opening 23 for precise alignment of the subtransmission 21c with respect to the main transmission 1. The centering opening 21 at the upper end of the case 8 is not used in this case for attachment of the subtransmission 21c.

In order to mount the motor 3 to the subtransmission 21c, and to mount the subtransmission 21c to the main transmission 1, while precisely adjusting the desired spacing between the shafts 5, 11, 12, only two centering pins 17a, 17 are needed, whereby one centering pin 17a is positively fitted in the centering opening 22 between confronting wall surfaces of the motor 3 and the subtransmission 21c, and the other centering pin 17b is positively fitted in the centering opening 23 between confronting wall surfaces of the subtransmission 21c and the main transmission 1. For illustrative purposes and ease of understanding, the centering opening 22 for alignment of the subtransmission 21c with the motor 3 is also shown in FIG. 3, even though FIG. 3 is a plan view upon the attachment surface 10 of the main transmission 1.

The centering openings 21a, 23 thus are provided for selective attachment of a subtransmission 21c (via centering opening 23), or a motor 3 (via centering opening 21a) onto the main transmission 1 to thereby realize a precise parallel disposition between the output shafts. As shown in FIG. 3, the rotation axis 20a of the output shaft of the subtransmission 21c is shifted in parallel relationship with respect to the position of the rotation axis 19 of the motor unit 3. The subtransmission 21c is thus mounted to the main transmission 1 and centered by the single centering pin 17b which is defined by a center axis 21b which, as indicated by reference numeral 29, lies in a common line with the rotation axes 20, 20a.

The alignment between the motor 3 to the subtransmission 21c is realized by the centering pin 17a whereby the center axis 21 also lies, as indicated by reference numeral 30, in a common line with the rotation axes 19, 20a.

In a spatial illustration, the rotation axes 19 and 20a and center axis 21, as well as the rotation axes 20, 20a and center axis 21b, respectively lie in a common plane.

Although only a single centering pin 17a or 17b is used between two abutting assemblies of the drive system according to the present invention, the cases made of cast metal can be connected together by screws, while allowing a play typical for screwed connections, and yet maintaining a sufficiently precise spacing between the shafts. Slight shifts of case parts about the centering pin only negligibly impact on the shaft spacing so that the modular configuration of the drive system is simplified in structure.

While the invention has been illustrated and described as embodied in a modular drive system it is not intended to be limited to the details shown since various modifications and structural changes may be made without departing in any way from the spirit of the present invention.

What is claimed as new and desired to be protected by letters patent is set forth in the appended claims:

1. A modular drive system, comprising:
   a plurality of assemblies connectable to one another in series, wherein immediately adjoining two assemblies form, in the flow direction of the power train, a leading assembly having a case and a rotatably supported driving shaft set within the case, and a trailing assembly having a case and a driven shaft in operative communication with the driving shaft, and driven shaft being radially offset to the driving shaft; and
   centering means for aligning the case of the leading assembly and the case of the trailing assembly with one another, said centering means including a centering pin received in form-fitting engagement in a single centering opening formed by complementary aligned bores provided in confronting walls of the case of the leading assembly and the case of the trailing assembly, said centering opening extending parallel to the driving shaft of the leading assembly and the driven shaft of the trailing assembly and defining a longitudinal axis which lies in a common plane with the driving shaft of the leading assembly and the driven shaft of the trailing assembly, wherein the plurality of assemblies includes a motor unit having an output pinion, a main transmission unit, and at least one subtransmission positioned between the motor unit and the main transmission unit, with the output pinion of the motor unit being of a same size as an output pinion of the at least one subtransmission.

2. The drive system of claim 1, and further comprising detachable fastening means for securely connecting the cases of the assemblies to one another.

3. The drive system of claim 1 wherein the leading assembly is the motor unit, and the trailing assembly is the main transmission unit.

4. The drive system of claim 1 wherein the centering pin is of cylindrical configuration.

5. The set of claim 1 wherein the centering pin is of cylindrical configuration.

6. A set of modular elements connectable to one another in series for the construction of a drive system, wherein immediately adjoining two elements form, in the flow direction of the power train, a leading assembly having a case and a rotatably supported driving shaft set within the case, and a trailing assembly having a case and a driven shaft in operative communication with the driving shaft, said driven shaft being radially offset to the driving shaft, said set further comprising centering means for aligning the case of the leading assembly and the case of the trailing assembly with one another, said centering means including a centering pin received in form-fitting engagement in a single centering opening formed by complementary aligned bores provided in confronting walls of the case of the leading assembly and the case of the trailing assembly, said centering opening extending parallel to the driving shaft of the leading assembly and the driven shaft of the trailing assembly and defining a longitudinal axis which lies in a common plane with the driving shaft of the leading assembly and the driven shaft of the trailing assembly, wherein the plurality of assemblies includes a motor unit having an output pinion, a main transmission unit, and at least one subtransmission adapted for disposition between the motor unit and the main transmission unit, said main transmission unit and said at least one subtransmission being configured for selective attachment to the motor unit, with the output pinion of the motor unit being of a same size as an output pinion of the at least one subtransmission.

7. The set of claim 6, including detachable fastening means for securely connecting the cases of the assemblies to one another.

8. The set of claim 6 wherein the leading assembly is the motor unit, and the trailing assembly is the main transmission unit.

* * * * *